United States Patent [19]

Barnhart

[11] 3,865,426
[45] Feb. 11, 1975

[54] ARRANGEMENT FOR SECURING SWINGING DOORS OF VEHICLES

[76] Inventor: Damon Barnhart, Rte. Seven West Hills Two, Frederick, Md. 21701

[22] Filed: June 18, 1973

[21] Appl. No.: 370,752

[52] U.S. Cl..................... 296/50, 296/146, 292/259
[51] Int. Cl............................................ B62d 25/00
[58] Field of Search ...... 296/50, 146; 292/DIG. .03, 292/259

[56] References Cited
UNITED STATES PATENTS

| | | | |
|---|---|---|---|
| 1,508,919 | 9/1924 | Cain et al. ........................... | 292/259 |
| 1,608,588 | 11/1926 | Dundek et al. .............. | 292/DIG. .03 |
| 2,983,402 | 5/1961 | Gottsegen ................... | 292/DIG. .03 |

Primary Examiner—Stanley H. Tollberg
Assistant Examiner—Norman L. Stack, Jr.

[57] ABSTRACT

An arrangement for securing swinging doors of vehicles or the like against unauthorized entry includes a bar which extends across the face of a pair of doors adjacent the top thereof and is mounted on arms pivoted on the sides of the doors at points above the level of the bar so that the bar can be swung upward out of the path of the opening doors. The bar has an upwardly directed plate member which is bent over at its top to rest on the top of the vehicle and to engage over an eye or the like through which a locked latch member is inserted.

3 Claims, 5 Drawing Figures

PATENTED FEB 11 1975  3,865,426

ARRANGEMENT FOR SECURING SWINGING DOORS OF VEHICLES

BACKGROUND OF THE INVENTION

1. Field of the Invention

The invention relates to an arrangement for making difficult unauthorized entry into the interior of a vehicle having a pair of doors hinged about vertical axes.

2. The Prior Art

Many arrangements have been suggested for accomplishing the purpose of the invention, but, as is well known, there is a great deal of breaking and entering into locked vehicles and theft of the contents thereof.

SUMMARY OF THE INVENTION

According to the present invention, an arrangement is provided which makes it difficult to break into a vehicle, and in which the locking member itself is arranged on the top of the vehicle so that it is difficult for anyone to break the lock without being on top of the vehicle. This means that such a person is more likely to be seen and apprehended by a watchman than someone working on a lock on the back or side of the vehicle.

According to the invention, in a vehicle having a pair of doors hinged about vertical axes, a bar is mounted across the face of the doors by arms pivoted on the sides of the vehicle body adjacent the top and at a level above the level of the bar in its lowered position, the bar engaging in its lowered position in upwardly opening recesses formed by members secured to the doors, and the bar having an upward extension which is bent over on top of the vehicle and is there secured by engaging with an elongated slot over an eyelet into which a locking bolt, padlock or the like can be inserted.

DESCRIPTION OF THE PREFERRED EMBODIMENTS

Figure 1:
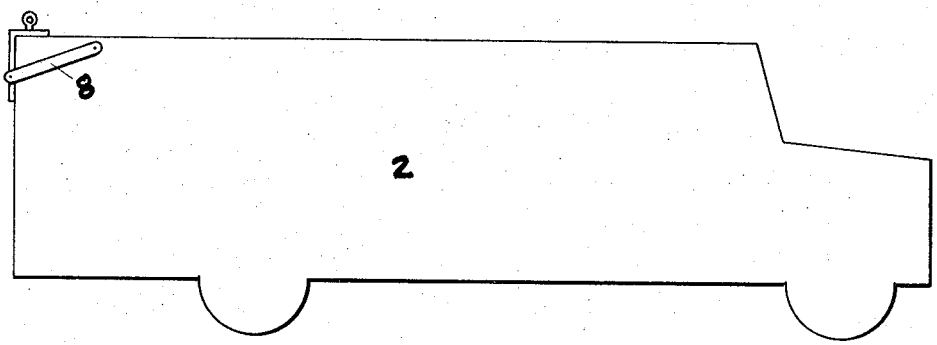
FIG. 1 shows in side elevation a vehicle provided with a locking means according to the invention.
Figure 2:
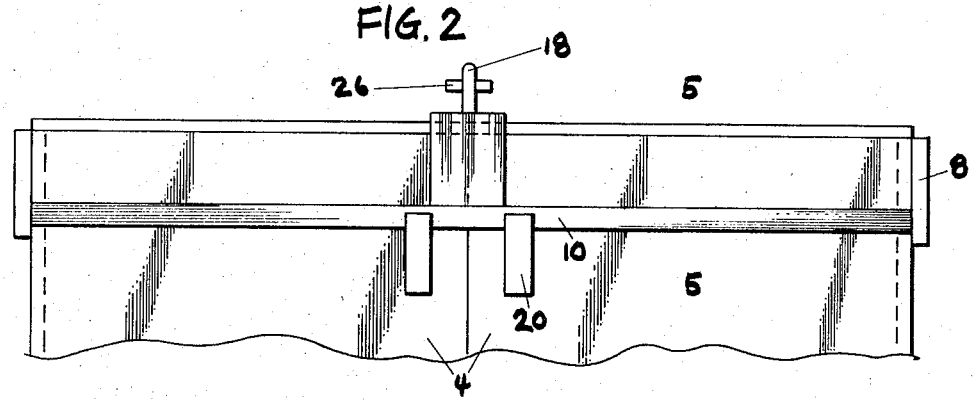
FIG. 2 is a rear view of the top portion of the vehicle with the locking means thereon.
Figure 3:
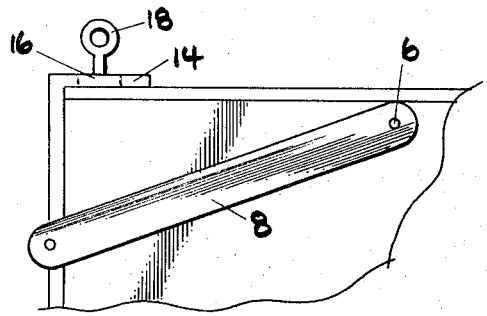
FIG. 3 is an enlarged view of a portion of FIG. 1.
Figure 5:
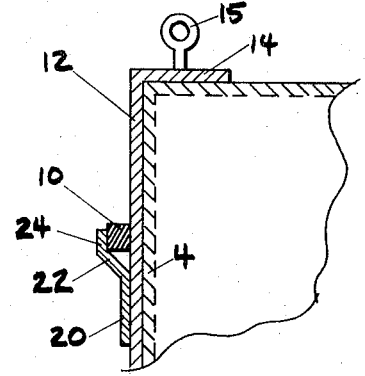
FIG. 5 is a cross-section substantially on the line 5—5 of FIG. 2.
Figure 4:
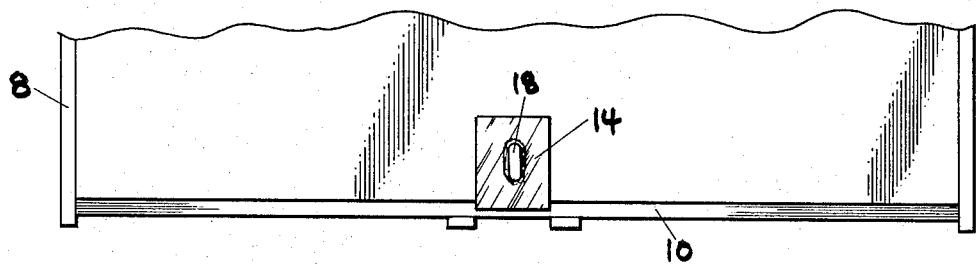
FIG. 4 is a top plan view of the rear end of the vehicle.

FIG. 1 shows a conventional vehicle body 2, having at its rear a pair of doors 4 hinged about vertical axes and meeting substantially in the center of the vehicle. On each side wall of the vehicle near the top there are pivoted at 6 arms 8 which in the locked position slant downward and carry at their ends a bar 10 which extends across the outer faces of the doors 4. The bar 10 has an upwardly extending member 12 with a bent over portion 14 having an elongated slot 16 engageable over an eye 18 secured in the roof of the vehicle.

On the outside of each of the doors 4 are members 20 having at their tops outwardly and upwardly directed parts 22, 24 which form upwardly opening recesses into which the bar 10 fits when in the lowered position. These members prevent unauthorized inward movement of the doors and also serve as stop means for the downward movement of the bar.

When the bar is in the position shown in the drawings, it is held in such position by a locking bolt, padlock or the like such as 26 which passes through the eyelet 18 and overlies the part 14.

When the locking device 26 is removed, the bar can be swung upwardly around the pivot points 6, and out of the grooves 22, 24, thus permitting the doors to be opened.

I claim:

1. In combination with a vehicle having a top and having doors at one end thereof hinged about vertical axes, a bar extending horizontally across the center of the doors, means mounting the bar for swinging movement between a lower position in which it engages on the outside of the doors to hold them closed and a raised position in which it is out of the path of the doors, a part secured to and extending upwardly from the bar and engageable on the top of the vehicle when the bar is in its lowered position, and means engageable with such part for securing it on the top so as to prevent raising of the bar.

2. In an arrangement as claimed in claim 1, said mounting means for the bar comprising arms pivoted at one end on the sides of the vehicle adjacent the top thereof, the bar being carried by the other ends of said arms.

3. In a device as claimed in claim 2, members secured on the outer faces of the doors having upwardly extending parts spaced from the doors and forming an upwardly open groove means in which the bar engages in its lowered position.

* * * * *